US006573672B2

(12) United States Patent
O'Rourke et al.

(10) Patent No.: US 6,573,672 B2
(45) Date of Patent: Jun. 3, 2003

(54) FAIL PASSIVE SERVO CONTROLLER

(75) Inventors: Kenneth O'Rourke, Glendale, AZ (US); Dean Wilkens, Scottsdale, AZ (US); Arthur D. Beutler, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/896,218

(22) Filed: Jun. 29, 2001

(65) Prior Publication Data

US 2003/0001530 A1 Jan. 2, 2003

(51) Int. Cl.$^7$ .................................................. H02P 1/18
(52) U.S. Cl. ....................... 318/254; 318/563; 318/564; 318/705; 318/706
(58) Field of Search ................................ 318/254, 563, 318/564, 705, 706

(56) References Cited

U.S. PATENT DOCUMENTS

| | | | |
|---|---|---|---|
| 3,924,167 A | | 12/1975 | Clark et al. ................... 318/254 |
| 4,162,438 A | * | 7/1979 | Osder ........................... 318/254 |
| 4,345,327 A | * | 8/1982 | Thuy ............................... 371/9 |
| 4,352,664 A | | 10/1982 | Morrison et al. .............. 434/14 |
| 4,494,051 A | | 1/1985 | Bailey ........................... 318/254 |
| 4,608,527 A | | 8/1986 | Glennon et al. .............. 318/685 |
| 4,799,159 A | * | 1/1989 | Davidson et al. ...... 364/424.06 |
| 5,298,839 A | | 3/1994 | Takeda ........................ 318/254 |
| 5,442,250 A | * | 8/1995 | Stridsberg .................... 310/186 |
| 5,506,776 A | * | 4/1996 | Fushimi et al. ......... 364/424.05 |
| 5,550,736 A | | 8/1996 | Hay et al. ............... 364/424.03 |
| 5,652,493 A | * | 7/1997 | Hendershot, Jr. ........... 318/701 |
| 5,694,014 A | | 12/1997 | Hegg et al. .................. 318/564 |
| 5,723,858 A | * | 3/1998 | Sugden .................... 250/231.13 |
| 5,821,660 A | | 10/1998 | Anderson .................... 310/184 |
| 5,828,195 A | * | 10/1998 | Zalesski ...................... 318/366 |
| 6,198,241 B1 | * | 3/2001 | Calamatas ................... 318/434 |

* cited by examiner

Primary Examiner—Robert E. Nappi
Assistant Examiner—Rina I. Duda

(57) ABSTRACT

The present invention provides apparatus, systems and methods for fail passive servo controllers. In accordance with an exemplary embodiment of the present invention, servo controller is used with an ALS to control an aircraft during landing procedures. In accordance with one aspect of this exemplary embodiment, upon a failure (e.g., of one of the components of ALS) servo controller fails passively rather than actively. In an exemplary embodiment, the fail passive nature of the servo unit is accomplished by providing at least two independent signal and drive current paths for controlling the servo motor. As such, the servo motor will not generate torque unless the two independent signal lanes agree. For example, when a component such as processor, difference amplifier, or PWM fails or otherwise ceases to function properly, servo motor will not runaway, but rather will fail with only minor transient movement, or alternatively, servo unit will lock at its current position. In this manner, servo motor will not generate a deviation from flight path or other significant control inputs until system monitors detect the fault and return control to the pilot.

32 Claims, 7 Drawing Sheets

FAIL PASSIVE SERVO CONTROLLER

BACKGROUND OF THE INVENTION

1. Technical Field

The present invention relates, generally, to fail passive servo controllers and systems, and more particularly, to fail passive servo controllers for brushless DC motors.

2. Background Art and Technical Problems

Various aircraft control systems have significantly improved safety, precision, and efficiency of travel. Many of these improvements are due in part to the control systems automating tasks that were previously performed by the vehicle operator. Such systems typically comprise a control unit which communicates with various servo units which in turn control the actions of the aircraft (e.g., turn, roll, climb, etc.). The servos generally include a motor, a gear unit and a clutch for engaging the motor and gear. When the motor and gear engage, among other functions, the servo acts to activate/manipulate control cables which control the actions of the aircraft. For example, autopilot servos may be used to control the aircraft during various stages of a flight plan.

Similarly, automatic landing systems (ALS), are often used to aid in landing the aircraft. However, given that landing an aircraft requires extremely precise control, the ALS should be fail passive. Stated otherwise, should the ALS fail, the ALS should not cause the aircraft to act in an undesirable manner (such as a sudden turn, roll or dive). For example, a non-fail passive servo drive has the potential to, in the absence of a command to do so, cause the servo to drive the motor and move the control cable(s) in one direction or another. This is often referred to as a "runaway" condition. When a runaway condition occurs, either system monitors or the pilot must detect the failure and disconnect the system, placing the aircraft under manual control.

Various landing standards are defined in the industry for describing the required precision of landing approaches. Exemplary standards include Category 1, or approximately one half mile visibility; Category 2, one eighth to one quarter mile visibility; and Category 3, with as little as 700 feet of visibility. Depending on the weather, in extreme conditions, visibility may be so low that the pilot is unable to see the aircraft's position relative to the runway, and the pilot must rely much more on the ALS system down to and including touchdown and roll out. Thus, at such times, precise ALSs may be used all the way through landing of the aircraft and is referred to as an "autoland". In many instances, ALS failures are minor and no hazards are posed. However, as the precision for an autoland increases, even minor failures can become more hazardous.

Further, current ALS systems typically used brushed DC motors. Brushed motors typically have multiple sets of rotor windings encased by one or more magnets. When the rotor windings are energized by an electric current, the rotor is polarized and the motor switches from one set of windings to the next. As the motor commutates, the rotor switches to the next set of windings, and a torque is created between the magnetic fields. However, brushed motor reliability is limited by brush wear and contaminant interaction with brush dust caused from normal use of the motor. In addition, brushed motors suffer performance disadvantages in the areas of thermal management and rotor inertia with respect to brushless motors.

Accordingly, methods, apparatus and systems are therefore needed in order to overcome these and other limitations of the prior art. Specifically, there is a need for application of fail passive DC motor control to brushless DC motors.

SUMMARY OF THE INVENTION

The present invention provides apparatus, systems and methods for fail passive servo controllers. In accordance with an exemplary embodiment of the present invention, servo controller is used with an ALS to control an aircraft during landing procedures. In accordance with one aspect of this exemplary embodiment, upon a failure (e.g., of one of the components of ALS) servo controller fails passively rather than actively. In an exemplary embodiment, the fail passive nature of the servo unit is accomplished by providing at least two independent signal and drive current paths for controlling the servo motor. As such, the servo motor will not generate torque unless the two independent signal lanes agree. For example, when a component such as processor, difference amplifier, or pulse width modulator (PWM) fails or otherwise ceases to function properly, servo motor will not runaway, but rather will fail with only minor transient movement, or alternatively, servo unit will lock at its current position. In this manner, servo motor will not generate a deviation from flight path or other significant control inputs until system monitors detect the fault and return control to the pilot.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

The following descriptions are exemplary embodiments only, and are not intended to limit the scope, applicability, or configuration of the invention in any way. Rather, the following description provides a convenient illustration for implementing various embodiments of the invention. Various changes may be made in the function and arrangement of elements described in the illustrated embodiments without departing from the spirit and scope of the invention as set forth in the appended claims. In addition, while the following detailed description often refers to various functional block components and processing steps, it should be appreciated that such functional blocks may be realized by any number of hardware, firmware, and/or software components configured to perform the specified functions and may either be incorporated in a single unit or distributed over multiple units. For example, the present invention may employ various integrated circuit components, e.g., memory elements, digital signal processing elements, look-up tables, and the like, which may carry out a variety of functions under the control of one or more microprocessors or other control devices which may be of an either digital or analog nature. Such general techniques and components that are known to those skilled in the art are not described in detail herein. Similarly, while the present invention is described herein in conjunction with brushless DC motors and aircraft autoland operations, other aircraft operations (e.g., cruise, autopilot and the like) and alternative vehicles such as automobiles may also be substituted and still fall within the ambit of the appended claims.

That being said, the present invention provides apparatus, systems and methods for fail passive servo controllers for use in, for example, aircraft control systems. For example, in accordance with an exemplary embodiment of the present invention, a servo unit and an ALS used to control an aircraft during landing procedures is provided. In accordance with one aspect of this embodiment, upon a failure of one of the components of ALS, servo unit fails passively rather than actively. The fail passive nature of servo unit may be accomplished by providing at least two independent signal and drive current paths (signal lanes) for controlling the servo motor. As such, the servo motor will not generate torque unless the two independent signal lanes agree. For example, when a component such as processor, difference amplifier, or PWM fails or otherwise ceases to function properly, servo motor will not runaway, but rather will fail with only minor transient movement, or alternatively, servo unit will lock at its current position. In this manner, servo motor will not generate any deviation from flight path or significant control inputs until system monitors detect the fault and returns control to the pilot.

Figure 1:
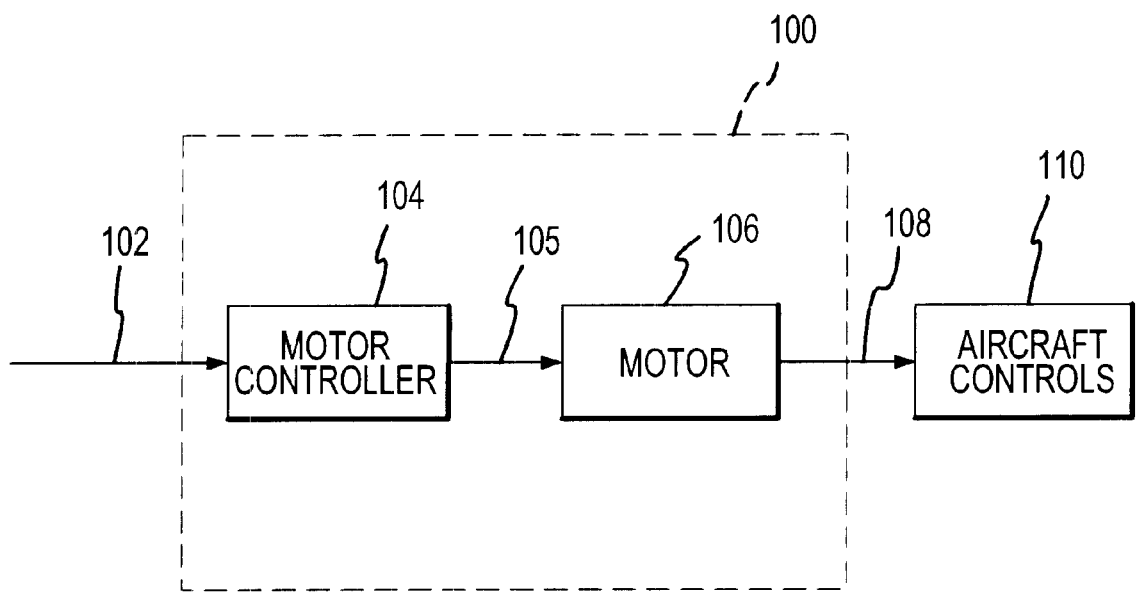
FIG. 1 is a block diagram of a servo unit in accordance with the present invention receiving signals from an ALS and outputting signals to aircraft controls.
Figure 2:
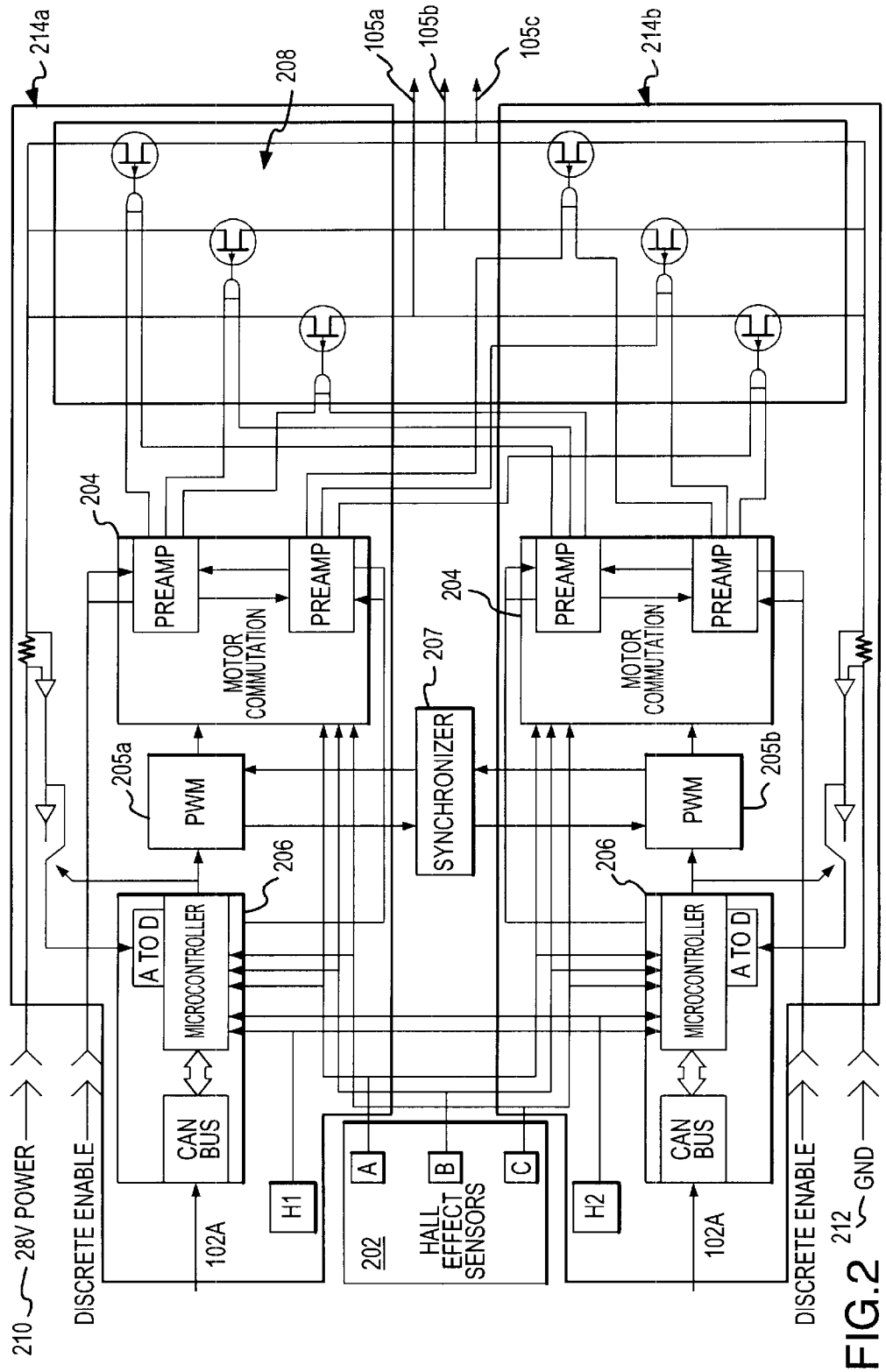
FIG. 2 is a schematic diagram of a servo unit with a "Y-Winding" brushless DC motor in accordance with an exemplary embodiment of the present invention.
Figure 3:
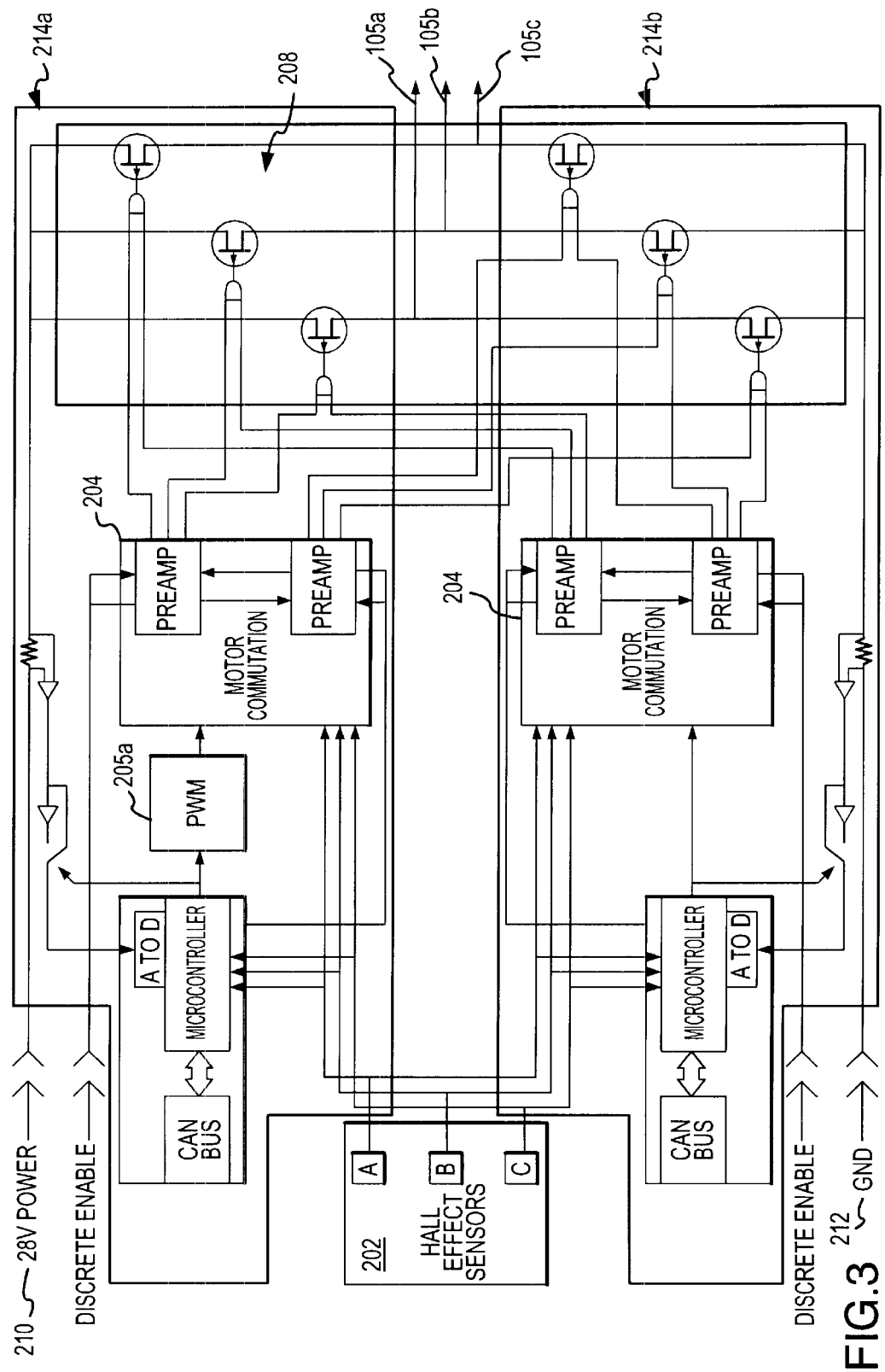
FIG. 3 is a schematic diagram of a servo unit with a "Y-Winding" brushless DC motor in accordance with an alternative embodiment of the present invention.

Thus, in accordance with an exemplary embodiment of the present invention and with reference to FIG. 1, servo unit 100 comprises an ALS input 102, a motor controller 104, a motor 106 and a motor output 108. ALS input 102 is a signal from any ALS controller now known or as yet unknown in the art capable of controlling a landing approach for an aircraft according to predefined standards, such as, for example, Category 1, 2 or 3 landings. As illustrated in FIGS. 2 and 3, ALS input 102 may be two independent signals. Alternatively, however, ALS input 102 may comprise a single signal. In such cases, it is preferable that signal 102 be monitored by controller 104 and have suitable self checking redundancy.

In the illustrated exemplary embodiments, ALS inputs 102A, B enter motor controller 104 and the signals from the ALS, are processed and used to control motor 106 which in turn creates motor output 108 for controlling aircraft controls 110. In the presently described, non-limiting embodiment, motor 106 is a brushless DC motor with a "Y-winding" configuration. However, as discussed in further detail herein, in accordance with various alternative embodiments of the present invention, motor 106 may comprise various alternative configurations and, in particular, may comprise a brushless DC motor with "delta-windings".

In accordance with the presently described embodiment, motor output 108 comprises any means suitable for mechanically translating the motion and torque of motor 106 into motion of aircraft controls 110. Generally, aircraft controls 110 include various aircraft components such as column wheel, column, and pedal inputs, primary flight cables, throttle cables, control surface or hydraulic pilot valve inputs and the like. In the exemplary embodiment, output 108 is the actual mechanical output of motor 106 and is provided via standard servo gearing and/or clutch mechanisms. Thus, motor 106 directly controls aircraft controls 110; in this embodiment, the primary flight cables. However, in accordance with various alternative embodiments of the present invention, output 108 may suitably comprise other types of now known or as yet unknown outputs for controlling aircraft controls 110. For example, in accordance with various aspects of the present invention, the motion of motor 106 may be translated into various electronic, analog, digital control signals or the like (e.g., "fly-by-wire"), which in turn direct aircraft controls 110.

With reference to FIG. 2, in accordance with an exemplary embodiment of the present invention, motor controller 104 controls a single, standard brushless DC motor 106 with Y-windings A,B,C. In this embodiment, motor controller 104 suitably comprises three controller outputs 105a–c to motor 106. With momentary reference to FIG. 5, a close-up schematic diagram of the Y-windings A,B,C of motor 106 illustrates the connection of outputs 105a–c to motor 106.

Figure 5:
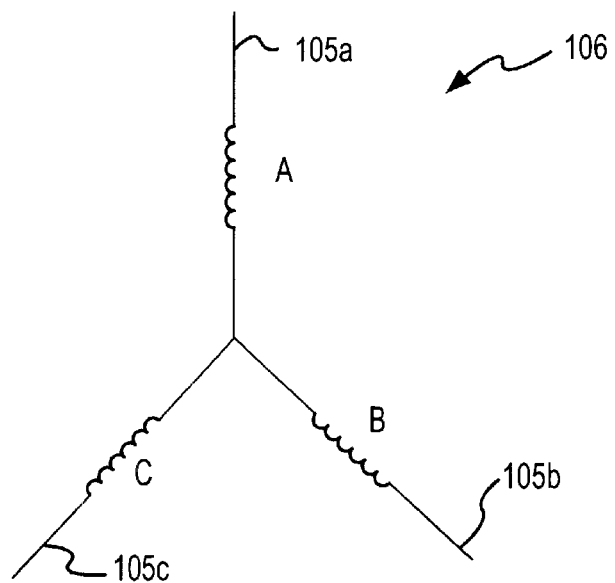
FIG. 5 is a close-up schematic diagram of a "Y-Winding" brushless DC motor in accordance with an exemplary embodiment of the present invention.

As shown in FIG. 5, an enclosed four-pole (two north and two south) magnetic rotor 402 within windings A,B,C is illustrated. The Y-configuration allows six different magnetic fields to be created based on the current directed through controller outputs 105a–c. Thus, by alternating the current through controller outputs 105a–c and thus, windings A,B,C, the magnetic field can be shifted, causing motor 106 to commute and thereby torquing rotor 402.

In accordance with various embodiments of the present invention, motor controller 104 comprises at least two separate and independent signal lanes 214a,b. Signal lanes 214a,b suitably allow servo unit 100 to be fail passive in that, in accordance with the present invention should a component of servo unit 100 fail, causing either of lanes 214a or 214b of motor controller 104 to fail, thus causing a "hard voltage" to be supplied to motor 106, motor controller 104 suitably limits the voltage applied to motor 106 so that the voltage of the failed lane is equivalent to that the fault free lane. Alternatively, upon such a failure of one of lanes 214a,b, motor controller 104 suitably redirects power through one of the other motor input pairs 105a–c in order to cause the voltage differential across motor 106 to be zero again; eliminating any magnetic fields which apply torque and turn motor 106.

In accordance now with various aspects of the present invention, each signal lane 214a,b of motor controller 104 suitably comprises various amplifiers 204 and microcontrollers 206 for controlling and providing power to a series of switches 208 which cause motor 106 to rotate to its desired position and, upon any failures of the components of lane 214a,b cause motor 106 to fail passively. Additionally, in accordance with various embodiments of the present invention, motor controller 104 also suitably comprises power supplies 210, grounds 212, and various feedback mechanisms. One skilled in the art will appreciate that various configurations of motor controller may include any number and alternatives of the foregoing components and still fall within the ambit of the appended claims. For example, with reference to FIGS. 2–4 and 6, components such as PWMs and/or synchronizers may be desirable depending on such factors as loop gain, pulse width modulation logic, motor gearing, and the amount of acceptable transient motion. For example, FIG. 2 illustrates an embodiment of the present invention having two PWMs 205a,b, one in each signal lane, which are synched through the use of a synchronizer 207. In contrast, FIG. 3 illustrates an exemplary embodiment of the present invention, having only one PWM 205 in a single signal lane, thus also eliminating a need for a synchronizer.

Figure 4:
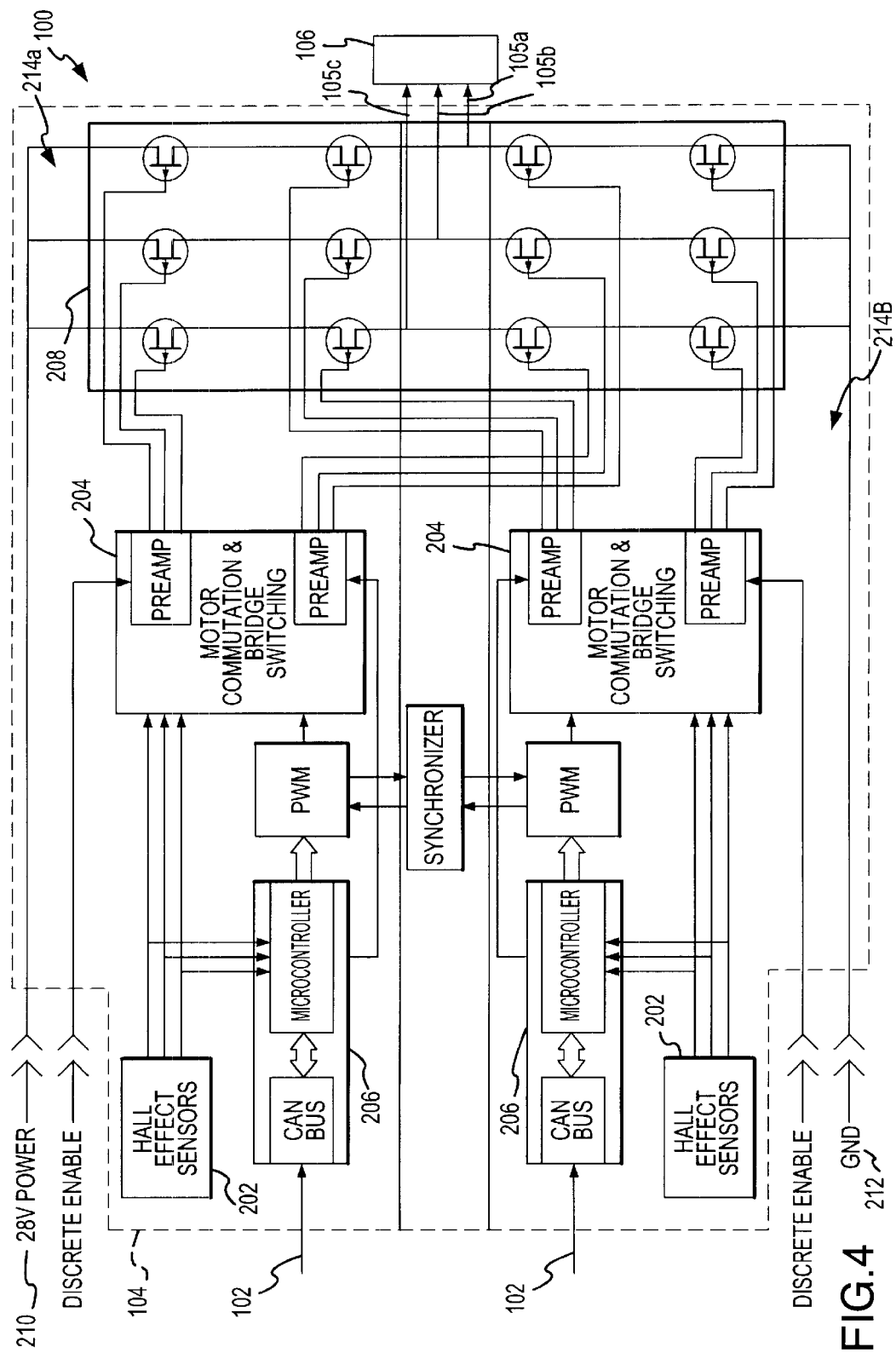
FIG. 4 is a schematic diagram of a servo unit with a "Y-Winding" brushless DC motor in accordance with an alternative embodiment of the present invention.
Figure 6:
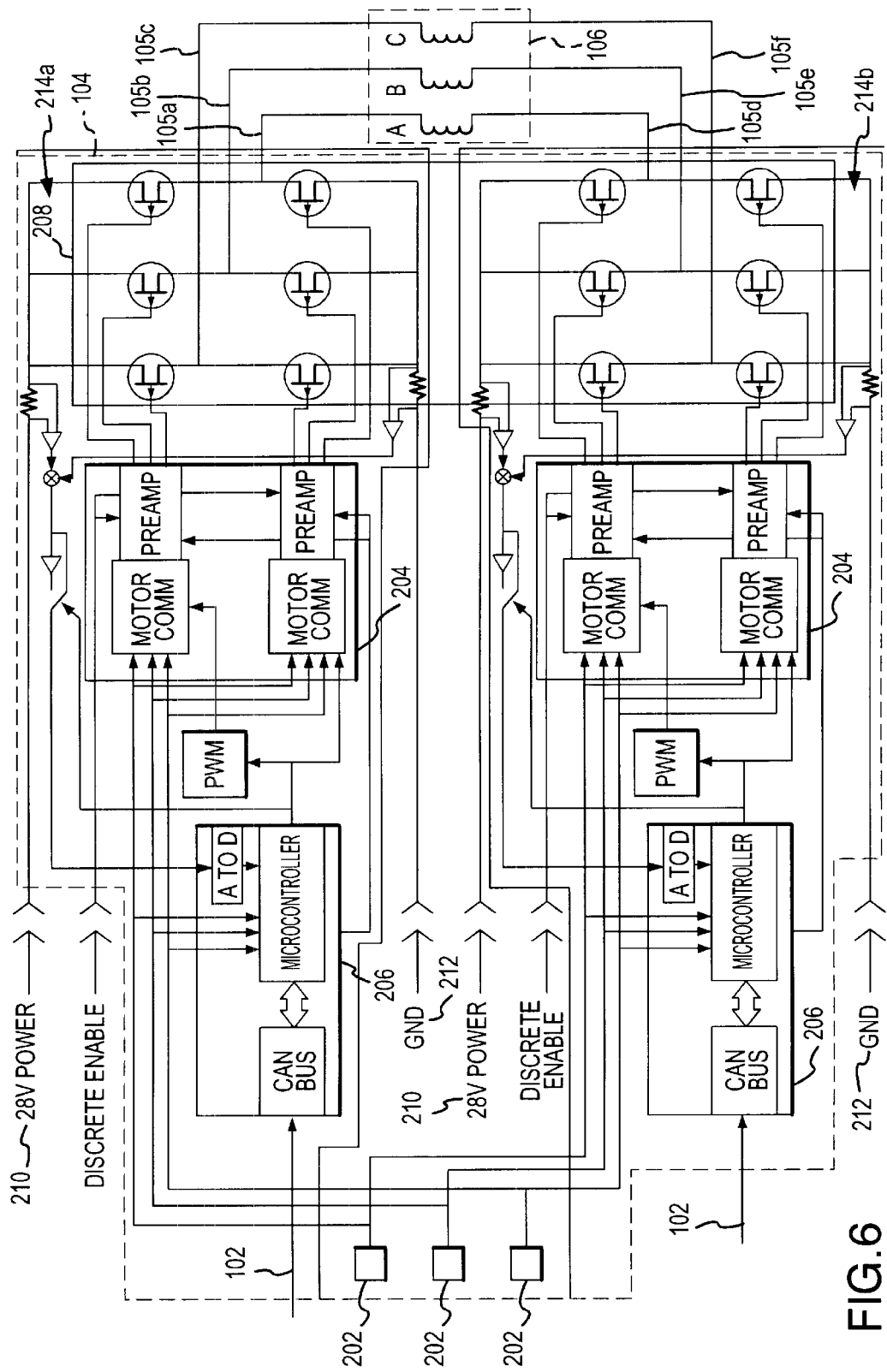
FIG. 6 is a schematic diagram of a servo unit with a "Delta-Winding" brushless DC motor in accordance with an exemplary embodiment of the present invention.

In the presently described embodiment, motor controller 104 suitably comprises at least one motor position sensor 202 which suitably enable motor controller 104 to know the location of motor 106 in its rotation. Knowing the position of motor 106 allows motor controller 104 to determine the polarity required in windings A,B,C in order to turn motor 106 to its desired position. In accordance with various embodiments of the present invention, one bank of sensors 202 may be in communication with both signal lanes 214a,b (as shown in FIGS. 2, 3 and 6) or, alternatively, each signal lane 214a,b may have its own bank of sensors 202 (as shown in FIG. 4). In these exemplary embodiments, position sensor 202 comprises one bank of three standard hall effect sensors 202a,b,c corresponding to windings A,B,C. Preferably, each sensor 202a,b,c corresponds to a winding A,B,C; in the present exemplary embodiments, sensors 202a,b,c are 120° apart. However, in accordance with various alternative embodiments of the present invention, varying numbers of sensors 202 as well as the banks containing sensors 202 may be provided. For example, as mentioned above and with reference to FIG. 4, two banks of sensors 202 are provided. Similarly, the use of other types of sensors and commutation schemes (e.g., analog sensors, sinusoidal commutation and the like) likewise fall within the scope of the present invention.

Referring to FIG. 4, as mentioned above, in accordance with the presently described embodiment, switches 208 are provided to suitably allow current through windings A,B,C to be controlled. In this embodiment, switches 208 comprise field effect transistors (FETs) such as International Rectifier HEXFET® devices. In the present embodiment, twelve FETs 208 are provided. However, in accordance with various alternative embodiments of the present invention, varying numbers of switches 208 may be provided. For example, with reference now to FIGS. 2 and 3, six FETs 208 are provided.

As previously mentioned, motor controller 104 is suitably configured so that servo unit 100 is fail/passive. For example, should a component of servo unit 100, including either lane 214a,b of motor controller 104 fail, causing a "hard voltage" to be supplied to motor 106, motor controller 104 would either limit the voltage applied to motor 106 to that commanded by the fault free lane or redirects power through one of the other motor input pairs 105a–c in order to cause the voltage differential across motor 106 to be zero; eliminating any magnetic fields which apply torque and turn motor 106.

In the presently described embodiment and referring again to FIG. 4, corresponding FETs 208 must first agree before current is passed through any of windings A,B,C. Stated otherwise, switches 208 and sensors 202 in each signal lane 214a,b continuously operate to detect illegal combinations of sensor states and invalid sequences of transition (e.g., disproportionate voltages in each lane) by standard algorithms. Normal operation of motor controller 104 means each signal lane 214 is receiving substantially the same command. For example, an application of fail passive servo unit 100 in accordance with this embodiment of the present invention follows.

During normal operation, lanes 214a,b can be expected to generate the same error signals between the position commanded and the position sensed by sensors 202 and thus similar PWM pulse widths should also be detected. Similarly, the outputs from each set of preamps 204 is expected to be similar resulting in, for a given motor 106 position, two series of FETs 208 connected bottom side and two series of FETs 208 connected top side are turned on. These devices will operate at a duty cycle determined by the PWMs. In the event of any failure of any FET 208 or any upstream circuitry within lanes 214a,b which causes excessive FET 208 duty cycle (e.g., a FET short) which would otherwise lead to uncommanded movement, the series FET 208 associated with the fault free lane limits the duty cycle to the correct value. Thus, no single failure can lead to excessive duty cycle, torque, motion or the like.

Figure 7:
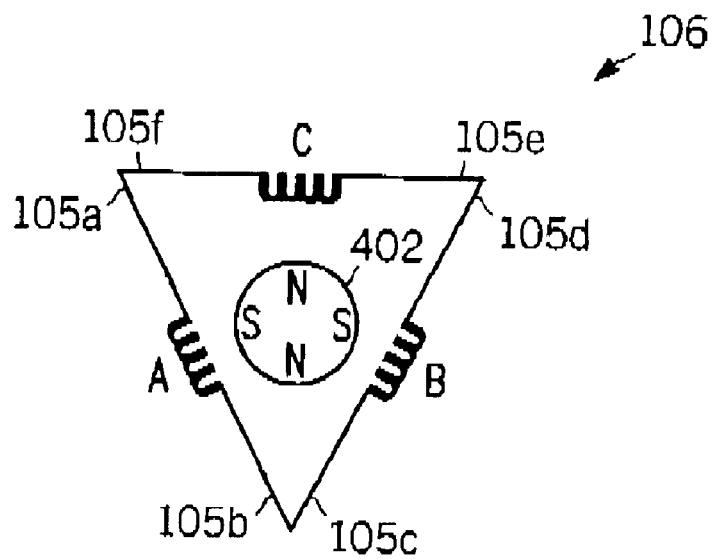
FIG. 7 is a close-up schematic diagram of a "Delta-Winding" brushless DC motor in accordance with an exemplary embodiment of the present invention.

With reference now to FIG. 6, in accordance with an alternative embodiment servo unit 100, motor controller 104 controls a single, standard brushless DC motor with Delta-windings A,B,C. In this exemplary embodiment, motor controller 104 suitably comprises six controller outputs 105a–f to motor 106. With momentary reference to FIG. 7, a close-up schematic diagram of the Delta-windings A,B,C of motor 106 illustrates the connection of outputs 105a–f to motor 106. An enclosed four-pole (two north and two south) magnetic rotor 402 within windings A,B,C is illustrated. The Delta-configuration allows six different magnetic fields to be created based on the current directed through controller outputs 105a–f. By alternating the current through controller outputs 105a–f and thus, windings A,B,C, the magnetic field can be shifted, torquing rotor 402 and causing motor 106 to turn. Thus, the Delta wound motor differs from the Y-wound motor primarily in that in the Y configuration one terminal of each coil A,B,C is available for connection with each of the other terminals of the three coils connected together whereas the both terminals of each coil of the Delta motor are externally accessible.

In accordance with various aspects of this Delta embodiment, each signal lane 214 of motor controller 104 again comprises various amplifiers 204, microcontrollers 206 within each lane 214a,b for controlling a series of switches 208. Again, one skilled in the art will appreciate that various configurations of motor controller 104 may include any number and alternatives of the foregoing components and still fall within the ambit of the appended claims.

As mentioned above, again, motor controller 104 suitably comprises at least one motor position sensor 202 which suitably enables motor controller 104 to know the location of motor 106 in its rotation. This again allows motor controller 104 to know the required polarity of windings A,B,C to turn motor 106 to its desired position. In this embodiment, position sensor 202 again comprises three hall effect sensors 202a,b,c.

With reference back to FIG. 6, motor controller 104 is suitably configured so that servo unit 100 is fail/passive. Again, if a component of servo unit, including either of lanes 214a or 214b of motor controller 104, fail, causing a "hard voltage" to be supplied to motor 106, motor controller 104 would either limit the voltage applied to the motor to that commanded by the fault free lane or redirect power through one of the other motor input pairs 105a–c in order to cause the voltage differential across motor 106 to be zero; eliminating any magnetic fields which apply torque and turn motor 106.

In accordance with the presently described embodiment, switches 202 are provided to suitably allow current through windings A,B,C to be controlled. Again, switches 202 preferably comprise FETs. As in the previously described embodiment relating to Delta-winding brushless DC motors, in the present embodiment, corresponding FETs 202 must first agree before current is passed through any of windings A,B,C.

Additionally, as briefly mentioned above, alternative vehicles other than aircraft, such as automobiles, may use servo controllers in accordance with the present invention. For example, instead of a cable from a gas pedal to the carburetor of the automobile, an electrical connection with a servo controlling the throttle valve could be provided. Similar to the runaway conditions described above, it is undesirable for the pedal to carburetor connection to fail and maintain the throttle completely open, and thus, as controller as described above could be provided to prevent such conditions. Thus, servo controllers in accordance with the present invention are more fail passive and thus, safer and more reliable.

Finally, although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

We claim:

1. A fail passive servo unit (100), comprising:
   a servo input (102);
   a motor (106); and
   a motor controller (104), having at least two corresponding signal lanes (214), wherein said corresponding signal lanes (214) must have corresponding voltages for said motor (106) to commutate, and wherein when a component of the servo unit (100) fails, said signal lanes (214) will not agree and said motor controller 104) will direct power through said signal lanes (214) such that a voltage differential across said motor (106) is zero.

2. The fail passive servo unit (100) of claim 1, further comprising a motor position sensor (202.)

3. The fail passive servo unit (100) of claim 2, wherein said motor position sensor (202) comprises three motor position sensors.

4. The fail passive servo unit (100) of claim 3, wherein said three motor position sensors (202) comprise hall effect sensors.

5. The fail passive servo unit (100) of claim 2, wherein said motor position sensor (202) comprise a hall effect sensor.

6. The fail passive servo unit (100) of claim 1, wherein said signal lanes (214) each further comprise at least one switch (208).

7. The fail passive servo unit (100) of claim 6, wherein said at least one switch (208) comprises 6 field effect transistors.

8. The fail passive servo unit (100) of claim 6, wherein said at least one switch (208) comprises 12 field effect transistors.

9. The fail passive servo unit (100) of claim 1, wherein said motor (106) is a brushless DC motor.

10. The fail passive servo unit (100) of claim 9, wherein said brushless DC motor (106) has windings in a Y-configuration.

11. The fail passive servo unit (100) of claim 10, wherein said brushless DC motor (106) has windings in a Delta-configuration.

12. The fail passive servo unit (100) of claim 1, wherein said servo input (102) is an automatic landing system (ALS) signal.

13. An automated landing system (ALS) fail passive servo unit (100), comprising:
    an ALS input (102);
    a brushless DC motor (106); and
    a motor controller (104), having at least two corresponding signal lanes (214), wherein said corresponding signal lanes (214) must agree for said motor (106) to commutate, each signal lane having at least one FET switch (208), wherein when a component of the servo unit (100) fails, said motor controller (104) directs power through said FET (208) in order to cause a voltage differential across said brushless DC motor (106) to be zero.

14. The ALS fail passive servo unit (100) of claim 13, further comprising at least one hall effect sensor (202) for detecting the position of said motor (106).

15. The ALS fail passive servo unit (100) of claim 14, wherein said hall effect sensor (202) comprises three hall effect sensors.

16. The ALS fail passive servo unit (100) of claim 13, wherein said at least one FET switch (208) comprises 6 FET switches.

17. The ALS fail passive servo unit (100) of claim 16, wherein said brushless DC motor (106) has windings in a Y-configuration.

18. The ALS fail passive servo unit (100) of claim 13, wherein said at least FET switch (208) comprises 12 FET switches.

19. The ALS fail passive servo unit (100) of claim 18, wherein said brushless DC motor (106) has windings in a Delta-configuration.

20. A fail passive servo unit (100), comprising:
    a servo input (102);
    a motor (106);
    a motor output (108); and
    a motor controller (104), having means for causing a voltage differential across said motor (106) to be zero when a component of the servo unit (100) fails, said means comprising at least two corresponding signal lanes (214), wherein said corresponding signal lanes (214) must have corresponding voltages for said motor (106) to commutate, and wherein when a component of the servo unit (100) fails, said signal lanes (214) will not agree and said motor controller (104) will direct power through said signal lanes (214) such that a voltage differential across said motor (106) is zero.

21. The fail passive servo unit (100) of claim 20, further comprising means for determining the position of motor (106).

22. The fail passive servo unit (100) of claim 21, wherein said means for determining the position of motor (106) comprises a hall effect sensor (202).

23. The fail passive servo unit (100) of claim 21, wherein said means for determining the position of motor (106) comprises three motor position sensors (202).

24. The fail passive servo unit (100) of claim 22, wherein said three motor position sensors (202) are hall effect sensors.

25. The fail passive servo unit (100) of claim 21, wherein said means for causing a voltage differential across said motor (106) comprises a field affect transistor (208).

26. A fail passive servo unit (100) of claim 21, wherein said means for causing a voltage differential across said motor (106) comprises 6 switches (208).

27. The fail passive servo unit (100) of claim 26, wherein said 6 switches (208) comprise field effect transistors.

28. The fail passive servo unit (100) of claim 20, wherein said means for causing a voltage differential across said motor (106) comprises 12 switches (208).

29. The fail passive servo unit (100) of claim 28, wherein said 12 switches (208) comprise field effect transistors.

30. The fail passive servo unit (100) of claim 20, wherein said motor (106) is a brushless DC motor.

31. The fail passive servo unit (100) of claim 30, wherein said brushless DC motor (106) has windings in a Y-configuration.

32. The fail passive servo unit (100) of claim 30, wherein said brushless DC motor (106) has windings in a Delta-configuration.

* * * * *